United States Patent [19]

Tateyama et al.

[11] 4,364,577
[45] Dec. 21, 1982

[54] STEERING MECHANISM

[75] Inventors: Masayuki Tateyama, Ohme; Takashi Hosotani, Tachikawa, both of Japan

[73] Assignee: Nissan Motor Company, Limited, Yokohama, Japan

[21] Appl. No.: 237,482

[22] Filed: Feb. 23, 1981

[30] Foreign Application Priority Data

Feb. 29, 1980 [JP] Japan ............................ 55-25971

[51] Int. Cl.³ ............................................. B62D 3/02
[52] U.S. Cl. ........................................ 280/93; 74/496
[58] Field of Search ............... 280/92, 93, 94; 74/496, 74/96, 501 R; 474/141

[56] References Cited

U.S. PATENT DOCUMENTS

| | | | |
|---|---|---|---|
| 2,982,564 | 5/1961 | Schreck | 280/93 |
| 3,040,827 | 6/1982 | Ulinski | 280/93 |
| 3,211,466 | 10/1965 | Ulinski | 280/93 |
| 3,839,610 | 10/1974 | Harlow | 280/92 |
| 4,182,426 | 1/1980 | Balzer | 280/93 |

Primary Examiner—Robert R. Song
Attorney, Agent, or Firm—Lane, Aitken, Kice & Kananen

[57] ABSTRACT

A steering mechanism for a use in a conveying and hoisting wheel vehicle having at least one steered vehicle wheel, comprises: a steering shaft; a first wheel rotatably driven by the steering shaft; a second wheel pivoting and steering the steered vehicle wheel and having a center axis of rotation extending on the equatorial plane of the steered vehicle wheel; torque transmitting means passed between the first and second wheels, the torque transmitting means having a travelling path having a meeting point at which the torque transmitting means is brought into tangential engagement with the second wheel and a parting point at which the torque transmitting means is brought out of engagement with the second wheel, the travelling path having a semi-circular turning portion at which the torque transmitting means is engaged with the circumferential section of the second wheel. The second wheel is formed to have such a circumference that the length between the center axis of rotation of the second wheel and any one of the meeting and parting points of the travelling path of the torque transmitting means is smaller than the length between the center axis of rotation of the second wheel and an arbitrary point on the semi-circular circumferential section of the second wheel in the state that the steered vehicle wheel assumes a straight movement position.

5 Claims, 9 Drawing Figures

STEERING MECHANISM

FIELD OF THE INVENTION

The present invention relates to a steering mechanism for use especially in a three-wheeled conveying and hoisting vehicle, and more particularly to a steering mechanism for a wheeled vehicle having at least one steered vehicle wheel.

DESCRIPTION OF THE PRIOR ART

Figure 1:
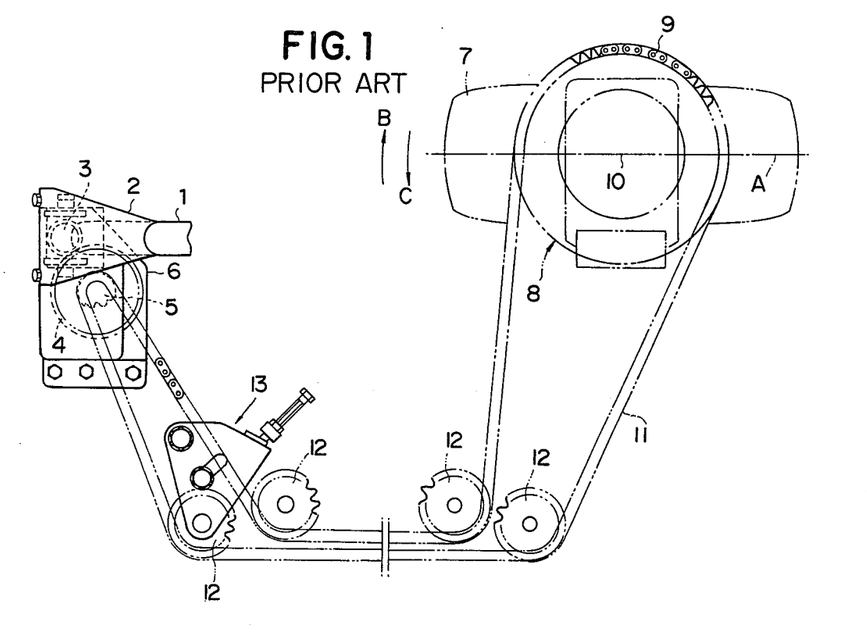
FIG. 1 is a fragmentary plan view of a prior art steering mechanism.

As a typical three-wheeled conveying and hoisting vehicle, such as a fork lift truck is well known. The fork lift truck is usually equipped with such a steering mechanism as shown in FIG. 1. The steering mechanism comprises a steering shaft having an upper end portion secured to a steering wheel, not shown, and a lower end portion rotatably supported on a bracket 2. To the lower end portion of the steering shaft 1 is drivably connected a drive gear 3 which is in mesh with a driven gear 4. A first or driving sprocket wheel 5 is rotatably supported on a gear case 6 and is in coaxial relationship to the driven gear 4 to be rotated therewith. A steered vehicle wheel 7 is to be pivoted and steered by a second or driven sprocket wheel 8 which has a substantially circular configuration. The second sprocket wheel 8 is rotatable around its center axis of rotation which is in coincidence with the center of the circular configuration thereof. Further, the second sprocket wheel 8 is securely mounted on a spindle carrier 9 at the rear end portion of the fork lift truck with the center axis of rotation in axial alignment with the pivot axis of the steered vehicle wheel 7 and extending on the equatorial plane A of the steered vehicle wheel 7. The center axis of rotation of the second sprocket wheel 8 and the pivot axis of the steered vehicle wheel 7 are indicated by the common reference numeral 10. An endless chain is passed between the first and second sprocket wheels 5 and 8 and is imparted a predetermined tension by a plurality of tension sprocket wheels 12 which are arranged in meshing engagement with the endless chain 11. The tension of the endless chain 11 is appropriately adjusted by means of a tension adjusting mechanism 13 which is operably connected with one of the tension sprocket wheels 12.

Figure 3:
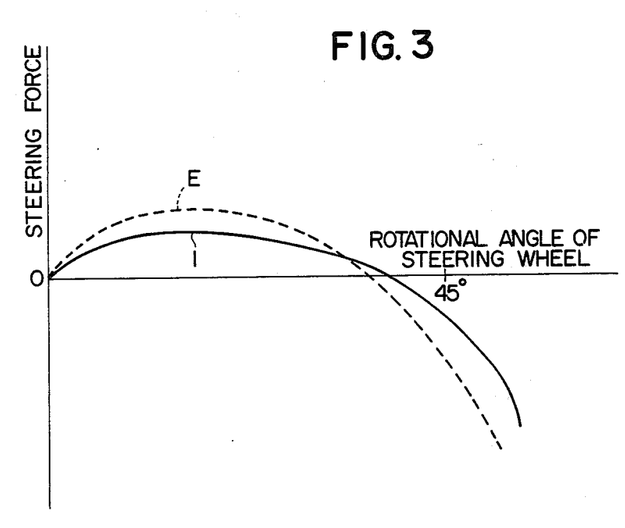
FIG. 3 is a diagram showing the relations between steering forces and the rotational angles of the steering wheels when vehicles, assembled with the steering mechanisms of the prior art and the present invention, move forwardly.
Figure 4:
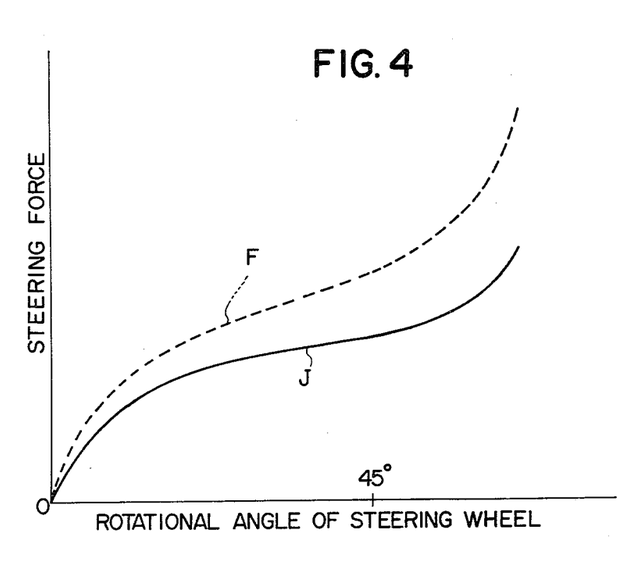
FIG. 4 is a diagram showing the relations between the steering forces and the rotational angles of the steering wheels when the vehicle, assembled with the steering mechanisms of the prior art and the present invention, move backwardly

The sprocket wheel 8 of the prior art steering mechanism has a substantially circular configuration so that the length is kept constant between the center axis 10 of rotation of the second sprocket wheel 8 and an arbitrary point on the circumference of the second sprocket wheel 8. A problem is thus encountered in that the steering force of the steering shaft 1 is varied as the steered vehicle wheel 7 is pivoted in a clockwise direction B or in a counterclockwise direction C from its straight movement position. More specifically, the steering reaction acted on the steering wheel is varied as the rotational angle of the steering wheel comes to be increased from its neutral directional sense position when the steered vehicle wheel 7 is pivoted in the clockwise direction B or in the counterclockwise direction C although the torque of the first sprocket wheel 5 is at all times transmitted to the second sprocket wheel 8 at a constant gear ratio as shown in a dotted straight line D in FIG. 2. As a consequence, the steering forces are respectively varied as shown in dotted curved lines E and F of FIGS. 3 and 4 during forward and backward movements or crusings of the vehicle as the rotational angle of the steering wheel is increased from its neutral directional sense position.

It is therefore an object of the present invention to provide an improved steering mechanism which overcomes the foregoing drawbacks inherent in the prior art steering mechanism and which can decrease variation of the steering force of the steering shaft as compared with that of the prior art steering mechanism so as to diminish steering efforts of the steering wheel by a driver.

The above object is accomplished by a steering mechanism embodying the present invention which comprises a steering shaft; a first wheel rotatably driven by the steering shaft; a second wheel pivoting and steering the steered vehicle wheel and having a center axis of rotation extending on the equatorial plane of the steered vehicle wheel; torque transmitting means passed between the first and second wheels to transmit a steering force from the first wheel to the second wheel when the first wheel is rotated by the steering shaft, the torque transmitting means having a travelling path having a meeting point at which the torque transmitting means is brought into tangential engagement with the second wheel and a parting point at which the torque transmitting means is brought out of engagement with the second wheel, the travelling path having a semi-circular turning portion at which the torque transmitting means is engaged with the circumferential section of the second wheel. The second wheel is formed to have such a circumference that the length between the center axis of rotation of the second wheel and any one of the meeting and parting points of the travelling path of the torque transmitting means is smaller than the length between the center axis of rotation of the second wheel and an arbitrary point on the semi-circular circumferential section of the second wheel in the state that the steered vehicle wheel assumes a straight movement position. The torque transmitting means may be constructed by an endless chain and each of the first and second wheel may be also constructed by a sprocket wheel. The second sprocket wheel may have a substantially elliptical configuration having a minor axis substantially in coincidence with the straight line connecting the meeting and parting points of the travelling path of the endless chain. The second sprocket wheel may have a substantially circular configuration with the center axis of rotation of the second sprocket wheel offset from the straight line connecting the meeting and parting points of the travelling path of the endless chain in a direction away from the circumferential section of the second sprocket wheel.

BRIEF DESCRIPTION OF THE DRAWINGS

The features and advantages of the steering mechanism according to the present invention will be more clearly understood from the following detailed description taken in conjunction with the accompanying drawings, in which.

DETAILED DESCRIPTION OF THE PREFERRED EMBODIMENTS

Figure 5:
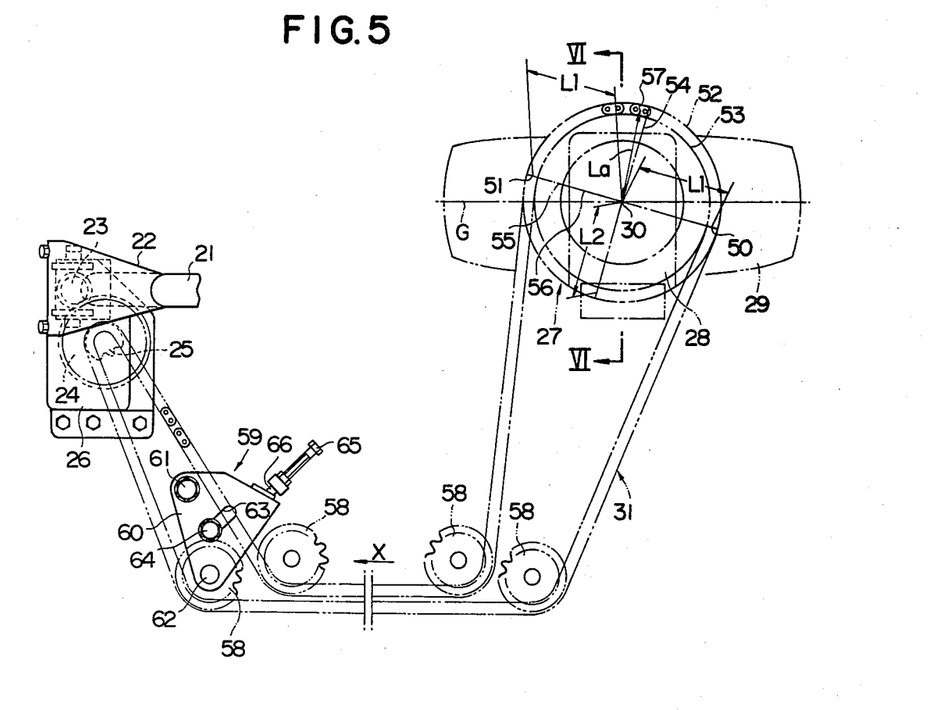
FIG. 5 is a fragmentary plan view showing the steering mechanism according to the present invention.

Referring now to the drawings and in particular to FIG. 5, there is shown a steering mechanism embodying the present invention and comprising a steering shaft 21 having an upper end portion secured to a known steering shaft, not shown, and a lower end portion rotatably supported on a bracket 22. To the lower end portion of the steering shaft 21 is drivably connected a drive gear 23 which is in mesh with a driven gear 24. A first or driving sprocket wheel 25 is rotatably supported on and accommodated in a gear case 26 and is in coaxial relationship to the driven gear 24 to be rotated therewith. A second or driven sprocket wheel 27 is rotatably carried on a vehicle wheel carrier 28 so as to pivot and steer a steered vehicle wheel 29 and has a center axis 30 of rotation extending on the equatorial plane G of the steered vehicle wheel 29. An endless chain 31 is passed between the first and second sprocket wheels 25 and 27 to transmit a steering force from the first sprocket wheel 25 to the second sprocket wheel 27 when the first sprocket wheel 25 is rotated by the steering shaft 21 through the drive and driven gears 23 and 24.

Figure 6:
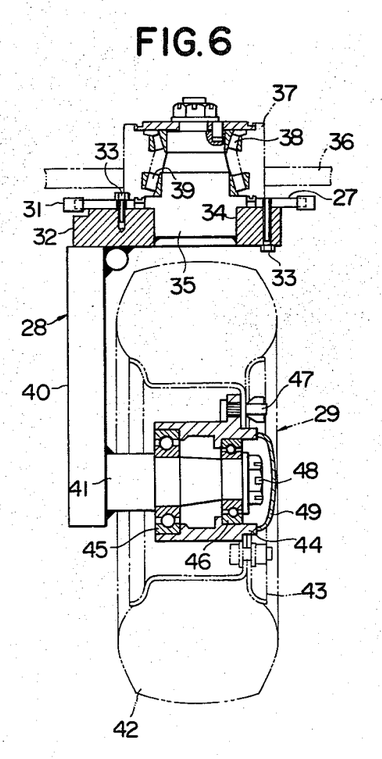
FIG. 6 is a fragmentary cross sectional view taken on lines VI—VI of FIG. 5 but showing a steered vehicle wheel steered by the steering mechanism according to the present invention.

The vehicle wheel carrier 28 is shown in FIG. 6 as having a substantially inverted L-shape in vertical cross section and as comprising an upper portion 32 to which the inner peripheral portion of the second sprocket wheel 27 is securely connected by a plurality of bolts 33. The upper portion 32 of the carrier 28 is formed with a vertical bore 34 in which a pivot spindle 35 is fixedly received. Shown in phantom lines in FIG. 6 is a vehicle body 36 which has a boss portion 37 rotatably connected to and supporting the pivot spindle 35 by bearings 38 and 39. The carrier 28 further comprises a lower portion 40 to which is securely connected a wheel spindle 41 extending axially outwardly from the lower portion 40 and having a center axis substantially perpendicular to and spaced apart downwardly from the pivot spindle 35. The steered vehicle wheel 29 comprises a pneumatic tire 42, a wheel disc 43 assembled with the pneumatic tire 42, and a hub member 44 rotatably supported on the wheel spindle 41 by means of bearings 45 and 46 and securely connected to the wheel disc 43 through wheel studs 47. The wheel spindle 41 has a free end portion which is in threaded engagement with a screw 48 which is in turn covered by a covering member 49 secured to the hub member 44.

Referring again to FIG. 5, the endless chain 31 has a closed-loop travelling path having a meeting point 50 at which the endless chain 31 is brought into tangential engagement with the second sprocket wheel 27 and a parting point 51 at which the endless chain 31 is brought out of engagement with the second sprocket wheel 27 if the endless chain 31 travels in a direction shown in arrow X. The travelling path of the endless chain 31 further has a semi-circular turning portion 52 at which the endless chain 31 is engaged with the circumferential section 53 of the second sprocket wheel 27. The second sprocket wheel 27 has a substantially elliptical configuration having a major axis 54 and a minor axis 55 substantially in coincidence with the vehicle body 36 which has a boss portion 37 rotatably connected to and supporting the pivot spindle 35 by bearings 38 and 39. The carrier 28 further comprises a lower portion 40 to which is securely connected a wheel spindle 41 extending axially outwardly from the lower portion 40 and having a center axis substantially perpendicular to and spaced apart downwardly from the pivot spindle 35. The steered vehicle wheel 29 comprises a pneumatic tire 42, a wheel disc 43 assembled with the pneumatic tire 42, and a hub member 44 rotatably supported on the wheel spindle 41 by means of bearings 45 and 46 and securely connected to the wheel disc 43 through wheel studs 47. The wheel spindle 41 has a free end portion which is in threaded engagement with a screw 48 which is in turn covered by a covering member 49 secured to the hub member 44.

Referring again to FIG. 5, the endless chain 31 has a closed-loop travelling path having a meeting point 50 at which the endless chain 31 is brought into tangential engagement with the second sprocket wheel 27 and a parting point 51 at which the endless chain 31 is brought out of engagement with the second sprocket wheel 27. The travelling path of the endless chain 31 further has semi-circular turning portion 52 at which the endless chain 31 is engaged with the circumferential section 53 of the second sprocket wheel 27. The second sprocket wheel 27 has a substantially elliptical configuration having a major axis 54 and a minor axis 55 substantially in coincidence with the straight line 56 connecting the meeting point 50 and the parting point 51 of the travelling path of the endless chain 31. According to the present invention, the length L1 measured between the center axis 30 of rotation of the second sprocket wheel 27 and the meeting point 50 or the parting point 51 of the travelling path of the endless chain 31 is required to be smaller than the length La measured between the center axis 30 of rotation of the second sprocket wheel 27 and an arbitrary point 57 on the semi-circular circumferential section 53 of the second sprocket wheel 27 when the steered vehicle wheel assumes a straight movement position. More specifically, the elliptical second sprocket wheel 27 thus formed above is arranged with respect to the vehicle wheel carrier 28 in such a manner as to permit the minor axis 55 of the elliptical configuration substantially in coincidence with the straight line 56 between the meeting and parting points 50 and 51 of the travelling path of the endless chain 31 when the steered vehicle wheel 29 is positioned at its straight movement position.

In order to impart a predetermined tension to the endless chain 31, a plurality of tension sprocket wheels 58 is shown in FIG. 5 as arranged in meshing engagement with the endless chain 31 which is appropriately adjusted in tension by a tension adjusting mechanism 59.

The tension adjusting mechanism 59 comprises a supporting bracket 60 pivotally supported on a pivotal pin 61 to rotatably sustain one of the tension sprocket wheels 58 through a pivotal pin 62, the supporting bracket 60 being formed with an arcuate slot 63 which slidably receives a guide pin 64 secured to a vehicle body structure, not shown, and a pneumatic or hydraulic cylinder 65 having a piston rod 66 pivotally connected to the bracket 60. The tension adjusting mechanism 59 thus can serve to adjust the tension of the endless chain 31 when the cylinder 65 is operated to project forwardly or retract backwardly to rotate the supporting bracket 60 around the pivotal pin 61.

Operation of the steering mechanism thus contructed and arranged will now be described hereinafter.

Figure 7:
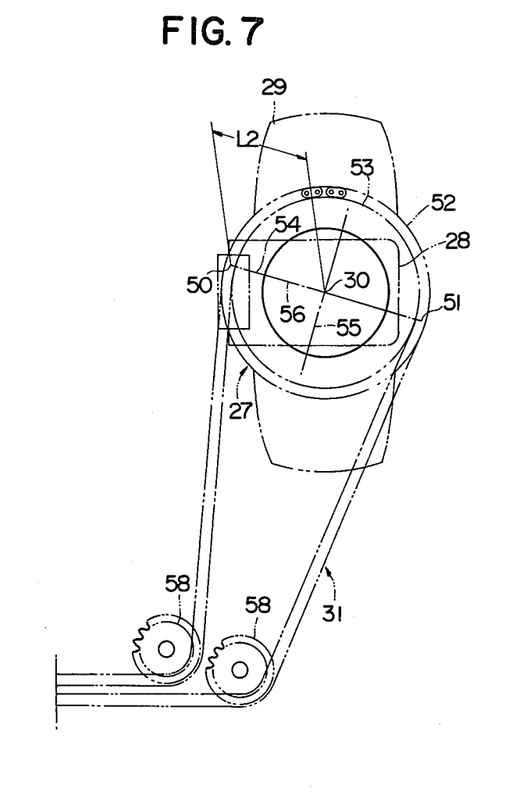
FIGS. 7 and 8 are fragmentary plan views of the second sprocket wheel rotated 90 degrees from the state of the second sprocket wheel shown in FIG. 5.
Figure 8:
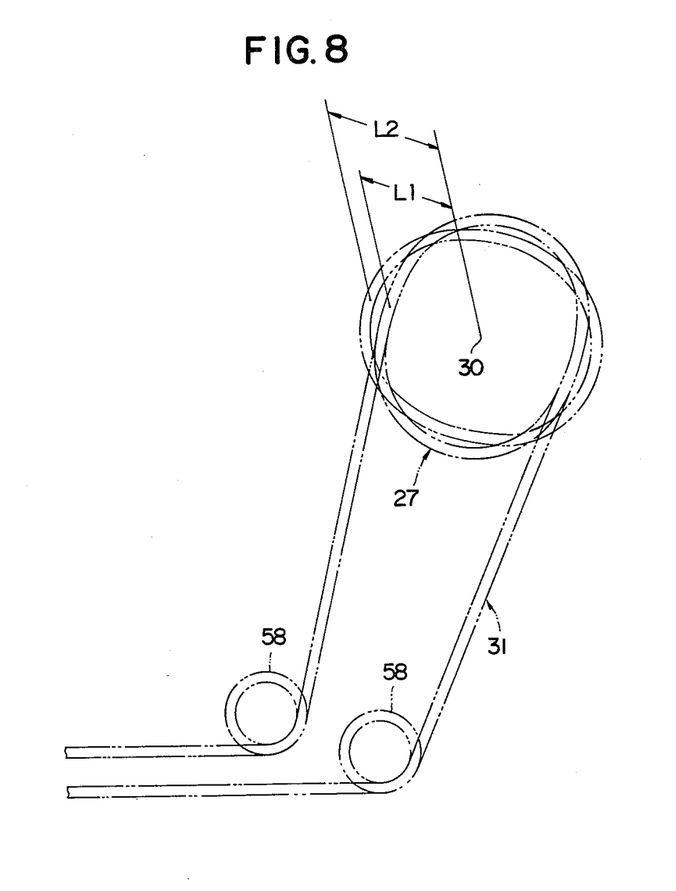

FIG. 5 illustrates a rotational state of the second sprocket wheel 27 under which the steered vehicle wheel 29 assumes its straight movement position, viz., under which the conveying and hoisting vehicle provided with the steering mechanism can move straightly. FIG. 7 illustrates a rotational state of the second sprocket wheel 27 under which the steered vehicle wheel 29 assumes a perpendicular directional sense position after being turned 90 degrees from the straight movement position thereof. In the latter, a length L2 measured between the center axis 30 of rotation of the second sprocket wheel 27 and the meeting point 50 or the parting point 51 of the travelling path of the endless chain 31 is substantially one half of the major axis 54 since the major axis 54 of the elliptical configuration is substantially in coincidence with the straight line 56 between the meeting and parting points 50 and 51 of the travelling path of the endless chain 31. If the rotational angle of the steered vehicle wheel 29 is gradually increased from the straight movement position shown in FIG. 5 to the perpendicular directional sense position shown in FIG. 7, a length $L\theta$ measured between the center axis 30 of rotation of the second sprocket wheel 27 and the parting point 51 of the travelling path of the endless chain 31 is gradually varied or increased from the length L1 to the length L2 as best shown in FIGS. 7 and 8. When the steered vehicle wheel 29 is therefore turned at a given rotational angle, the length $L\theta$ can be given as follows.

$$L\theta = \frac{1}{\sqrt{\frac{\cos^2\theta}{L1^2} + \frac{\sin^2\theta}{L2^2}}}$$

where the legend $\theta$ indicates an angle measured from the straight line 56 to the minor axis 55 of the elliptical configuration. As a consequence, a reduction gear ratio $R\theta$ is given as follows, $$R\theta = (L\theta/L1)\cdot k,$$

where the legend k represents a constant.

Figure 2:
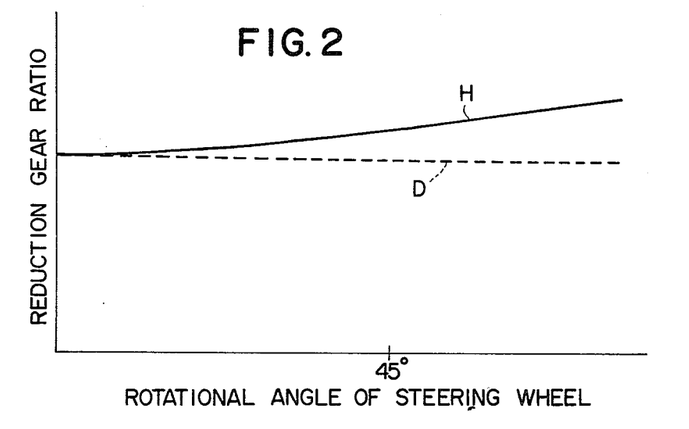
FIG. 2 is a diagram showing the relations between reduction gear ratios of first and second sprocket wheels and rotational angles of steering wheels for the steering mechanisms of the prior art and the present invention.

Therefore, the reduction gear ratio $R\theta$ of the first and second sprocket wheels 25 and 27 is gradually increased as shown in a solid line H in FIG. 2 and the length $L\theta$ is gradually increased from the length L1 to the length L2 as the rotational angle of the steered vehicle wheel 29 is gradually increased from the neutral directional sense position to the perpendicular directional sense position thereof. On the assumption that the length of the minor axis of the second sprocket wheel 27 is at this time equal to the diameter of the second sprocket wheel 8 of the prior art steering mechanism as shown in FIG. 1, the steering force or reaction of the steering wheel is minimized or decreased as shown in solid curved lines I and J in FIGS. 3 and 4 as compared with that of the steering wheel in the prior art steering mechanism as also shown in dotted curved lines E and F in FIGS. 3 and 4 as the steering wheel is rotated by a driver toward its large rotational angle from its neutral directional sense position.

It is therefore to be understood that the steering effort by the driver can be decreased in the steering mechanism according to the present invention as compared with the prior art steering mechanism. As a result, the steering wheel can be sharply rotated around its neutral directional sense position and the steering force of the steering wheel can be kept nearly to a constant level even at its large rotational angle in a manually operated steering mechanism. Moreover, the steering wheel can be stably operated around its neutral directional sense position and the manipulation of the steering wheel can be facilitated in the event that the steering force is required for rotating of steering wheel at such a large rotational angle as in a narrow parking space.

In this instance, the endless chain 31 may be loosened while the second sprocket wheel 27 is turned by 90 degrees in the counterclockwise direction from its state shown in FIG. 5. Assuming that the lengths of the major and minor axes of the second sprocket wheel 27 are for example 270 mm and 240 mm, respectively, it is necessary to have an endless chain 31 loosened by a length of approximately 2 mm which can be readily taken up by the tension sprocket wheels 58.

Figure 9:
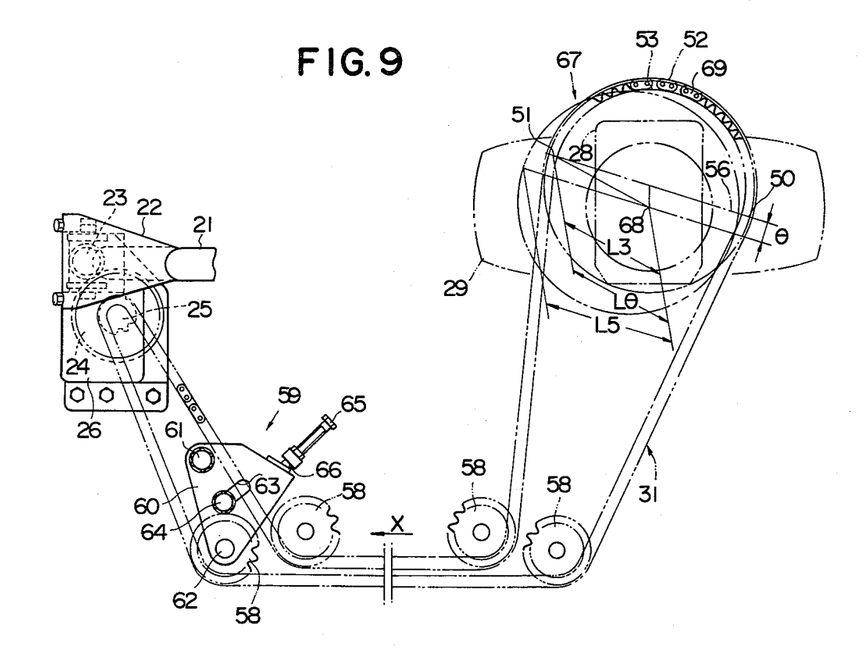
FIG. 9 is a fragmentary plan view similar to FIG. 5 but showing another embodiment of the present invention.

FIG. 9 illustrates another embodiment of the steering mechanism according to the present invention. The components and members of the steering mechanism shown in FIG. 9 is substantially identical to those of the steering mechanism shown in FIG. 5 with the exception that an eccentric sprocket wheel 67 is used in place for the elliptical sprocket wheel 27. The components and members of the steering mechanism shown in FIG. 9 are thus indicated by the same reference numerals as those of FIG. 5, and will not be described hereinafter.

The eccentric sprocket wheel 67 which has a substantially circular configuration with the center axis 68 of rotation of the second sprocket wheel 67 offset by length e from the straight line 56 connecting the meeting and parting points 50 and 51 of the travelling path of the endless chain 31 in a direction away from the circumferential section 69 of the second sprocket wheel 67. Therefore, the eccentric sprocket wheel 67 has two lengths L3 and L5 the former of which is measured between the center axis 68 and the parting point 51 when the eccentric sprocket wheel 67 assumes a rotational state under which the steered vehicle wheel 29 is at its straight movement position and the latter of which is measured from the center axis 68 to the parting point 51 when the eccentric sprocket wheel 67 assumes another rotational state under which the steered vehicle wheel 29 is at a perpendicular directional sense position after being turned 90 degrees from the straight movement position thereof. In a similar manner to FIG. 5, the length $L\theta$ measured between the center axis 68 of rotation of the second sprocket wheel 67 and the parting point 51 of the travelling path of the endless chain 31 is gradually varied or increased from the length L3 to the length L5 as shown in FIG. 9 as the rotational angle of the steered vehicle wheel 29 is gradually increased from the straight directional sense position to the perpendicular directional sense position.

In this embodiment, the steering force or reaction of the steering wheel is minimized or decreased as compared with that of the steering wheel in the prior art steering mechanism as the steering wheel is rotated by a driver toward its large rotational angle from its neutral directional sense position. It is similarly to be understood that the steering effort by the driver can be decreased in the steering mechanism according to the present invention as compared with the prior art mechanism.

While it has been described that the endless chain 31 travels in the direction indicated in arrow X so as to permit the steered vehicle wheel 29 to be turned in the counterclockwise direction C in FIG. 5, the endless chain 31 may be traveled in the direction opposite to the direction X if the steered vehicle wheel 29 is to be turned in the clockwise direction B. In this case, the meeting point 50 and the parting point 51 of the travelling path of the endless chain 31 assume their positions indicated by the reference numerals 51 and 50, respectively.

In the above embodiments as shown in FIGS. 5 and 9, the endless chain 31 is not required to have a closed-loop travelling path but may be separated at the semi-circular turning portion of the travelling path to have opposite ends securely or pivotally connected to the circumferential section of the second sprocket wheel 27. This results from the reasons that the steered vehicle wheel 29 is not rotated at a rotational angle of over 90 degrees. However, it is preferable that the opposite ends of the endless chain 31 be closely arranged on the circumferential section of the second sprocket wheel 27. Although the endless chain 31 and the sprocket wheel 27 are employed in the above embodiments, suitable belt and pulley may be used in place of the endless chain 31 and the sprocket wheel 27 according to the present invention. In the event that the belt is employed, the first sprocket wheel 5 is required to be changed into a pulley. The chain 31 or the belt constitutes a torque transmitting means, while the sprocket wheel 27 or the pulley constitutes a first wheel in the present invention.

The above mentioned embodiments of the steering mechanism may be adapted to steer two steered vehicle wheels according to the present invention.

What is claimed is:

1. A steering mechanism for a wheel vehicle having at least one steered vehicle wheel, comprising:
a steering shaft;
a first wheel rotatably driven by said steering shaft;
a second wheel pivoting and steering said steered vehicle wheel and having a center axis of rotation extending on the equatorial plane of said steered vehicle wheel;
torque transmitting means passed between said first and second wheels to transmit a steering force from said first wheel to said second wheel when said first wheel is rotated by said steering shaft, said torque transmitting means having a travelling path having a meeting point at which said torque transmitting means is brought into tangential engagement with said second wheel and a parting point at which said torque transmitting means is brought out of engagement with said second wheel, said travelling path having a semi-circular turning portion at which said torque transmitting means is engaged with the circumferential section of said second wheel; characterized in that said second wheel is formed to have such a circumference that the length between the center axis of rotation of said second wheel and any one of said meeting and parting points of said travelling path of said torque transmitting means is smaller than the length between the center axis of rotation of said second wheel and an arbitrary point on the semi-circular circumferential section of said second wheel in the state that said steered vehicle wheel assumes a straight movement position.

2. A steering mechanism as set forth in claim 1, wherein said torque transmitting means is constructed by an endless chain and each of said first and second wheels is constructed by a sprocket wheel.

3. A steering mechanism as set forth in claim 2, wherein said second sprocket wheel has a substantially elliptical configuration having a minor axis substantially in coincidence with the straight line connecting said meeting and parting points of said travelling path of said endless chain.

4. A steering mechanism as set forth in claim 2, wherein said second sprocket wheel has a substantially circular configuration with the center axis of rotation of said second sprocket wheel offset from the straight line connecting said meeting and parting points of said travelling path of said endless chain in a direction away from the circumferential section of said second sprocket wheel.

5. A steering mechanism as set forth in claim 2, which further comprises a plurality of tension sprocket wheels arranged in meshing engagement with said endless chain for taking up the slack thereof, and tension adjusting means operably connected to one of said tension sprocket wheels for adjusting the tension of said endless chain.

* * * * *